June 26, 1962  B. F. NOLTE, JR  3,040,651
CHARCOAL GRILL
Filed Aug. 17, 1960
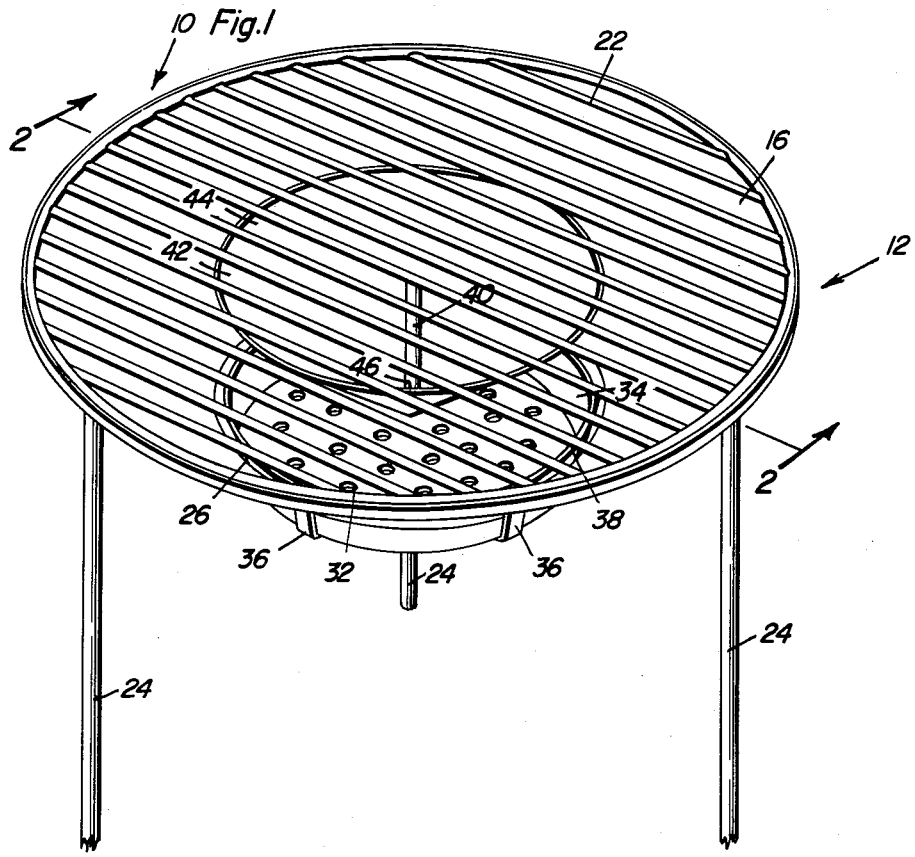
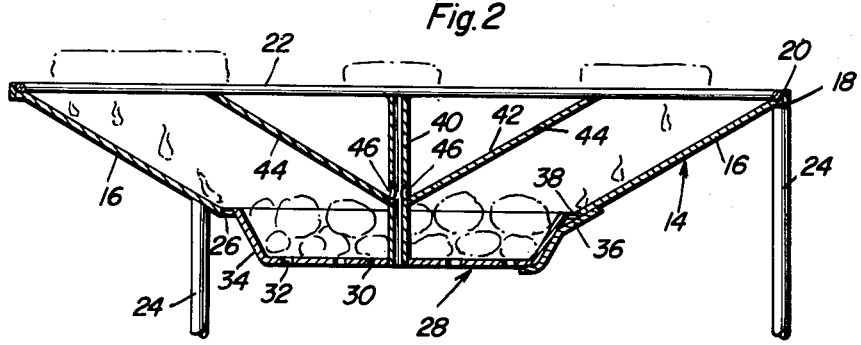
Benjamin F. Nolte, Jr.
INVENTOR.

United States Patent Office 3,040,651
Patented June 26, 1962

3,040,651
CHARCOAL GRILL
Benjamin F. Nolte, Jr., 2323 29th St., Ashland, Ky.
Filed Aug. 17, 1960, Ser. No. 50,108
4 Claims. (Cl. 99—446)

This invention relates to a novel and useful charcoal grill, and more particularly to a portable charcoal grill of the type normally used outside for preparing food for picnics and the like.

Although the present invention may also be incorporated into the construction of various other types of charcoal grills, it is particularly well adapted for use in connection with the portable type of charcoal grill used for preparing food for picnics and the like.

When using a charcoal grill the fire is usually started sometime before the actual cooking of food commences in order to provide glowing coals over which food may be prepared rather than subjecting the food being cooked to open flames. However, when cooking meats such as steaks, which are considered more tasty when broiled with a certain amount of fat remaining on the steak, drippings from the meat and the fat fall into the fire pan of a charcoal grill over which the grill supporting the meat is disposed. The drippings from the meat and fat are flamable and burst into flame upon contact with the glowing coals of the charcoal fire. Of course, more fatty meat will cause a larger amount of drippings to fall into the charcoal fire.

The main object of this invention is to provide a charcoal grill which will be constructed in a manner whereby drippings falling from the meat being prepared will not fall into the fire thus enabling the meat to be cooked over glowing embers rather than open flames.

A further object of this invention, in accordance with the immediately preceding object, is to provide a charcoal grill having an area partially protected from the intense heat of the charcoal fire which may be used as a warming area for buns and the like.

A final object to be specifically enumerated herein is to provide a charcoal grill which will conform to conventional forms of manufacture, be of simple construction and easy to use so as to provide a device that will be economically feasible, long lasting and satisfactorily operable by even persons unfamiliar with the operation of charcoal grills.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 is a perspective view of the charcoal grill comprising the instant invention; and FIGURE 2 is a vertical sectional view taken substantially upon the plane indicated by the section line 2—2 of FIGURE 1.

Referring now more specifically to the drawing the numeral 10 generally designates the charcoal grill comprising the present invention which includes a support frame generally referred to by the reference numeral 12. The support frame includes an upwardly opening receptacle generally referred to by the reference numeral 14 having downwardly convergent side walls 16. The receptacle 14 is generally inverted truncated cone shaped and the upper edges of the side walls 16 terminate in a horizontal annular flange 18 which in turn terminates in an upstanding cylindrical flange 20. A circular grill 22 has its outer marginal undersurfaces supported by the upper surfaces of the annular flange 18 and the cylindrical upstanding flange 20 maintains the grill 22 in vertical alignment with the receptacle 14.

The receptacle 14 also includes a plurality of depending support legs 24 whose upper ends are secured in any convenient manner to the undersurfaces of the annular flange 18 for supporting the receptacle 14 in an elevated position above the ground.

The downwardly convergent side walls 16 of the receptacle 14 terminate a spaced distance from the opposite side walls and define an opening 26 in the bottom of the receptacle. A fire pan generally referred to by the reference numeral 28 including a bottom wall 30 provided with suitable air inlet apertures 32 and upstanding upwardly divergent side walls 34 is mounted in vertical alignment with the opening 26 by means of brackets 36. The diameter of the opening 26 is greater than the diameter of the fire pan tray 28 thereby defining an annular passage 38 between the upper ends of the walls 34 and the lower ends of the walls 16.

A tubular support standard 40 has its lower end secured in an opening formed in the center of the bottom wall 30 of the fire pan tray 28 in any convenient manner and an upper portion of the tubular standard 40 is secured in an opening formed in the apex of the inverted cone shaped partition 42 in any convenient manner. The downwardly convergent side walls 44 of the partition 42 may have their uppermost ends horizontally aligned with the upper surfaces of the annular flange 18 whereby they will directly underlie the grill 22. Further, if it is desired the upper end of the tubular standard 40 may be secured to the grill 22 in any convenient manner.

It will be noted that the upper ends of the downwardly convergent side walls 44 of the partition 42 extend outwardly beyond the lower ends of the downwardly convergent side walls of the receptacle 14 whereby it will be impossible for drippings from meat to drop from the grill directly into the fire pan tray 28. If drippings fall outwardly of the upper ends of the side walls 44 of the partition 42, they will fall upon the side walls 16 of the receptacle 14 and pass through the passage 38 to the ground disposed beneath the charcoal grill 10. In this manner, the dropping of grease from meat being cooked on the grill 22 into the fire pan tray 28 will be prevented.

The area of the grill 22 disposed immediately above the partition 42 may be utilized as a warming area to warm buns or to thaw meat and it will be noted that the standard 40 is provided with a plurality of openings 46 immediately above the lowermost ends of the side walls 44 whereby drippings collected in the bottom of the partition 42 will pass through the openings 46, down through the tubular standard 40 and out the lower end of the latter beneath the fire pan tray 28. The confronting surfaces of the walls 44 and 16 define a passage communicating with an outer annular area of the grill 22 upon which meat and other food may be placed to be cooked. Inasmuch as substantially all of the heat of the fire within the fire pan tray 28 must pass upwardly through this annular area of the grill 22, very little heat of the charcoal fire within the fire pan tray 28 is lost. In addition to providing a means for preventing the drippings from entering the fire pan tray 28, the opening 38 provides an additional draft opening for the fire in the fire pan tray 28.

In operation, a charcoal fire is built within the fire pan tray 28 which fire receives air through the apertures 32. Meat to be cooked may be placed on the outer annular area of the grill 22 disposed between the side walls 44 and 16 and buns and other food to be warmed may be placed on the grill 22 disposed immediately above the partition 42. Any drippings from the meat disposed in the outer annular area of the grill 22 will fall vertically onto the inner surfaces of the walls 16 whereupon the drippings will flow down the walls 16 and out through the passage 38. Should any drippings be collected in the bottom of the partition 42 adjacent the standard 40, these drippings will pass through the openings 46 and down through the tubular standard 40.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A charcoal grill comprising a support frame, a horizontal grill supported by said support frame, an upwardly opening fire pit tray, means supporting said fire pit tray beneath said grill, a partition, means supporting said partition wall in vertical alignment with said fire pit tray, said partition comprising an upwardly opening open top receptacle having downwardly convergent side walls, said supporting means for said partition including a tubular standard, means securing the lower end of said standard through the bottom of said tray and the upper end of said standard through the bottom of said partition between the lower ends of said side walls in fluid tight sealing engagement therewith, passage means for draining the food drippings collected between the confronting inner surfaces of said partition, said passage means including at least one opening formed in said tubular standard above the lower edges of the side walls of said partition with said partition spaced from and in overlying relation to the upper edges of said tray whereby grease dripping from food on said grill will fall on said partition wall or beyond the outer edges of said tray.

2. The combination of claim 1 wherein the outer surfaces of said partition receptacle and the inner surfaces of said frame partition defining a passage for directing heat from said fire pit tray to the area of said grill are disposed outwardly of the upper ends of the side walls of said partition.

3. A charcoal grill comprising a support frame, said frame including an upwardly opening receptacle, said receptacle having downwardly converging side walls whose lower ends are spaced apart and define an opening in the bottom of said receptacle, an upwardly opening fire pit tray including a bottom and upstanding side walls, means mounting said tray in vertical alignment with said opening and with the upper edges of said side walls disposed adjacent a horizontal plane passing through said opening, the lower edges of said side walls of said receptacle being spaced outwardly from the outer surfaces of the upper ends of the side walls of said tray defining a passage through which greases flowing down said side walls of said receptacle may pass to prevent their entrance into said fire pit tray, a horizontal food supporting grill, means for supporting said grill between the upper ends of the walls of said receptacle, and a partition, means for supporting said partition beneath said grill and above said fire pit tray, said partition having a plan area a size and shape to extend beyond the edges of the upper edges of the walls of said tray whereby grease dropping from food on said grill will either drop on said partition or the downwardly convergent side walls of said receptacle and pass through said passage thereby preventing grease from entering said fire pit tray, said partition comprising an upwardly opening open top receptacle having downwardly convergent side walls, said supporting means for said partition including a tubular standard, means securing the lower end of said standard through the bottom of said tray and the upper end of said standard through the bottom of said partition between the lower ends of said side walls in fluid tight sealing engagement therewith, passage means for draining the food drippings collected between the confronting inner surfaces of said partition, said passage means including at least one opening formed in said tubular standard above the lower edges of the side walls of said partition.

4. The combination of claim 3 wherein said receptacle is inverted truncated cone shaped and said partition is inverted cone shaped whereby an outer annular area of said grill is communicated directly with said fire pit tray between the confronting surfaces of the walls of said receptacle and the walls of said partition.

References Cited in the file of this patent

UNITED STATES PATENTS

| 2,762,893 | Long et al. | Sept. 11, 1956 |
| 2,943,557 | Suehlsen | July 5, 1960 |